United States Patent
Kim et al.

(10) Patent No.: US 8,706,943 B2
(45) Date of Patent: Apr. 22, 2014

(54) SYSTEM FOR INTERFACING BETWEEN A TERMINAL AND A SMART CARD, METHOD FOR SAME, AND SMART CARD APPLIED TO SAME

(75) Inventors: Jin Tae Kim, Seoul (KR); Kyung Ok Lee, Seoul (KR); Eun Su Jung, Gyeonggi-Do (KR); Hoo Jong Kim, Gyeonggi-Do (KR)

(73) Assignee: SK Planet Co. Ltd. (KR)

( * ) Notice: Subject to any disclaimer, the term of this patent is extended or adjusted under 35 U.S.C. 154(b) by 483 days.

(21) Appl. No.: 12/736,795

(22) PCT Filed: Jul. 29, 2009

(86) PCT No.: PCT/KR2009/004230
§ 371 (c)(1),
(2), (4) Date: Nov. 9, 2010

(87) PCT Pub. No.: WO2010/016678
PCT Pub. Date: Feb. 11, 2010

(65) Prior Publication Data
US 2011/0117961 A1 May 19, 2011

(30) Foreign Application Priority Data

Aug. 8, 2008 (KR) .................. 10-2008-0078153
Aug. 8, 2008 (KR) .................. 10-2008-0078156

(51) Int. Cl.
*G06F 13/20* (2006.01)
*G06F 3/00* (2006.01)

(52) U.S. Cl.
USPC ........... 710/313; 710/2; 710/5; 710/8; 710/15

(58) Field of Classification Search
None
See application file for complete search history.

(56) References Cited

U.S. PATENT DOCUMENTS

| 5,887,266 | A | 3/1999 | Heinonen et al. |
| 2007/0043957 | A1 | 2/2007 | Benoit et al. |
| 2007/0131780 | A1* | 6/2007 | Ho .............................. 235/492 |
| 2009/0124251 | A1 | 5/2009 | Niccolini |

FOREIGN PATENT DOCUMENTS

| CN | 1379608 | 11/2002 |
| CN | 101099400 | 5/2006 |
| EP | 1039403 | 9/2000 |
| KR | 10-2008-0012835 | 2/2008 |

OTHER PUBLICATIONS

Carsten Rust, et al., "The SIM card as an Enabler for Security, Privacy, and Trust in Mobile Services", Universita di Roma "Tor Vergata".

* cited by examiner

*Primary Examiner* — Scott Sun
(74) *Attorney, Agent, or Firm* — Baker Hostetler LLP

(57) ABSTRACT

The present invention provides a system and method for interfacing between a terminal and a smart card embedded within smart card, and a Universal Subscriber Identification Module (USIM), and a smart card applied to the same. That is, the execution procedure of a service application in the smart card is defined using a new interface between the terminal and the smart card by providing construction of a smart card equipped with one or more service applications, executing the special service application according to the request of the terminal, providing an output value according to the execution of the special application to the terminal, and requesting a special I/O device.

6 Claims, 6 Drawing Sheets

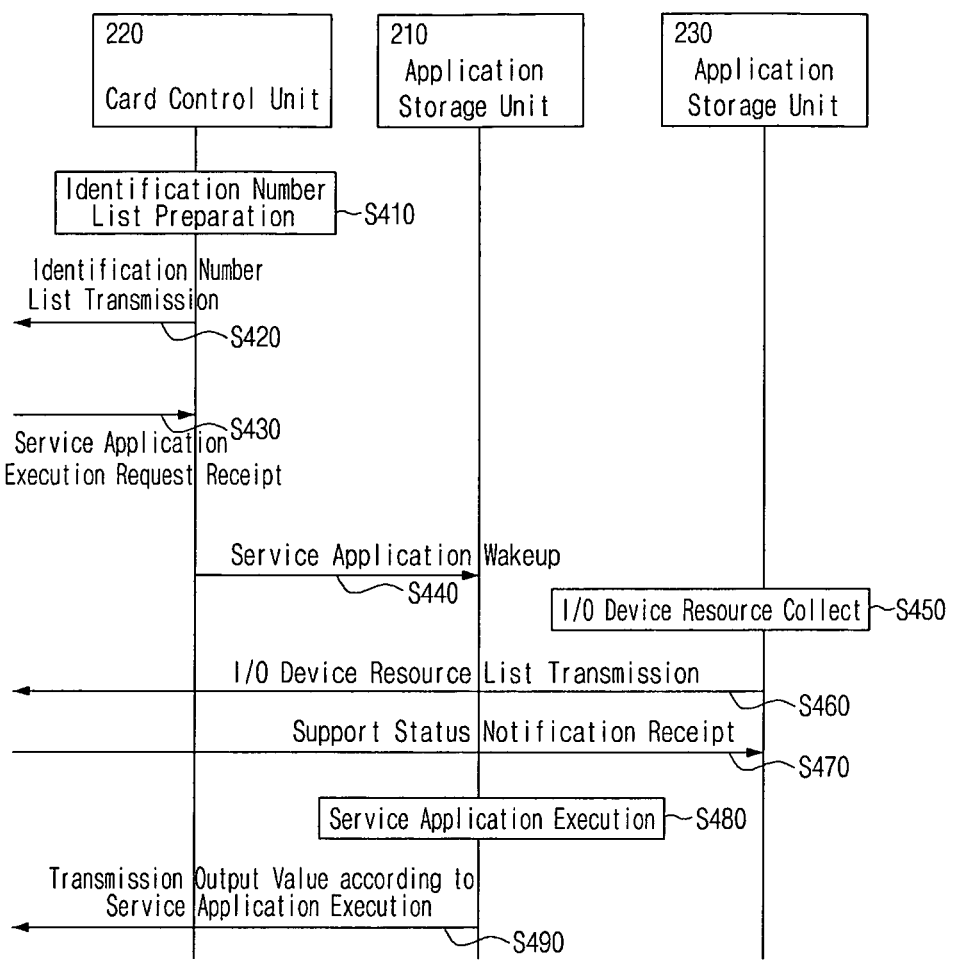

SYSTEM FOR INTERFACING BETWEEN A TERMINAL AND A SMART CARD, METHOD FOR SAME, AND SMART CARD APPLIED TO SAME

BACKGROUND

1. Field

One or more example embodiments relate to an interface between a terminal and a smart card, and more specifically to an interface system between the terminal and the smart card and a method that makes the terminal be dummy by defining a service execution procedure in the inside of the smart card using a new interface between the terminal and the smart card and that applies a core function of service application to a high density smart card, and the smart card applied to the same.

2. Description of the Related Art

High capacity USIM card refers to a smart card with a configuration in the form of a single chip, for example, combined with a high-capacity NAND flash memory on an existing USIM card. This USIM card can be loaded with various operator services (WIPI Application, etc.), and provide customers with large amount of memory (larger than 256 Mbytes or 1 GByte). Thus, the needs for high capacity USIM cards are increasing.

In this regard, previously mobile service applications resided on the software platform within a terminal, but as described above, with the development of high capacity smart card technology, the environment has been established to put service applications into USIM cards due to the increased card performance.

However, to realize the service application existing in the HD USIM card with the terminal interworked as such, definition for new interface standards between the terminal and the USIM card are needed.

SUMMARY

Exemplary embodiments relate to an interface between a terminal and a smart card, and more specifically to provide an interface system between the terminal and the smart card and a method that makes the terminal be dummy by defining a service execution procedure in the inside of the smart card using the new interface between the terminal and the smart card and that applies a core function of service application to a high density smart card, and a smart card applied to the same.

According to one or more embodiments, there may be provided an interface system between a terminal and a smart card embedded with a USIM (Universal Subscriber Identify Module), the interface system comprising: a terminal for including one or more input/output (I/O) devices required for interworking in executing a service application, requesting execution of a special service application equipped within the smart card to the smart card, controlling execution of a special input/output device requested according to the execution of the special service application; and a smart card for executing the special service application among one or more service applications equipped according to the request of the terminal, transmitting an output value according to the execution of the special application, and requesting the execution of the special input/output device.

According to one or more embodiments, there may be provided a smart card embedded with a USIM for executing an Application On Card function by forming an interface with a terminal, the smart card comprising: an application storage unit for storing one or more service applications executable on the software platform; a card control unit for waking up the corresponding service application stored in the application storage unit according to an execution request of the special service application received from the terminal; and an application interworking unit for providing the output value according to the execution of the special service application to the terminal by checking the supporting status for the special input/output device equipped onto the terminal requested for interworking according to the execution of the special service application.

According to one or more embodiments, there may be provided an interface method for executing a service application embedded within a smart card, the interface method comprising: requesting execution of a special service application embedded within the smart card to the smart card; receiving a list of input/output devices requested for execution from the smart card in executing the special service application; checking a support status for the special input/output device included into the list of received input/output devices and notifying the support status to the smart card; and receiving an output value according to the execution of the special service application from the smart card and executing the special input/output device.

According to one or more embodiments, there may be provided an interface method with a terminal to carry out an Application On Card function, the interface method comprising: waking up a corresponding service application embedded according to an execution request of a special service application received from the terminal; checking support for a special input/output device on the terminal requested for interworking in executing the special service application; and providing an output value according to the execution of the special service application to the terminal if the support for the special input/output device is checked.

The system and method for interfacing between a terminal and a smart card, and smart card applied to the same according to the present invention can change terminals into dummy devices having only I/O resource, and allow mobile carriers to provide services directly to their customers without cooperation with the terminal manufacturers by implementing core functions of service applications within a smart card, and also, the development costs for terminal development can be reduced.

In addition, the system and method for interfacing between a terminal and a smart card, and smart card applied to the same according to the present invention will be able to maintain the mobile carrier's service and the customer's personal data if they hold the same smart card even though their terminal changes.

BRIEF DESCRIPTION OF THE DRAWINGS

FIG. 6 is a flow chart to describe the behavior of the smart card in the interface method between a terminal and a smart card according to an example embodiment of the present invention.

DETAILED DESCRIPTION OF PREFERRED EMBODIMENTS

With reference to the attached drawings, preferable embodiments of the present invention are explained below.

Figure 1:
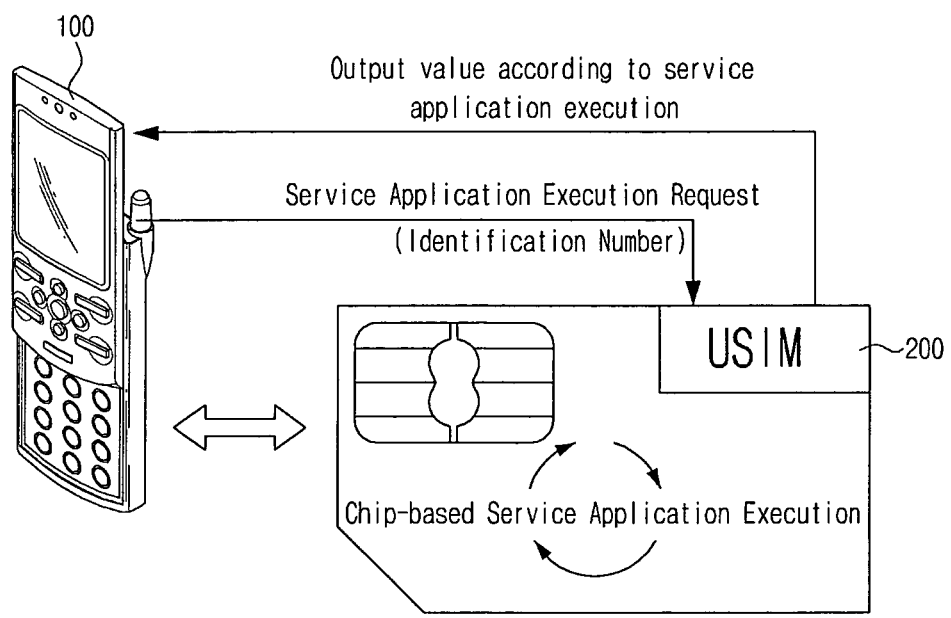
FIG. 1 is an outline configuration of an interface system between a terminal and a smart card according to an example embodiment of the present invention.

FIG. 1 depicts an outline configuration of an interface system between a terminal and a smart card according to an example embodiment of the present invention.

As shown at FIG. 1, the system has a configuration including a terminal (100) equipped with one or more I/O devices requested for interworking during the execution of a service application, transferring an output value according to the execution of the special service application of the equipped smart card (200) to a user through a prepared special input/output device; and a smart card (200) embedded with USIM (Universal Subscriber Identify Module), providing an output value according to the execution of the embedded special service application to the equipped terminal (100).

The terminal (100) is equipped with several input/output devices, and requests the smart card (200) to execute the special service application according to the user's request through the input/output device. More specifically, the terminal (100) can have the configuration including typical UI (User Interface) equipped with mobile communication terminals such as a keypad, LCD screen, speakers, etc. by the model or by the manufacturer, and also including a wireless interface such as Bluetooth, WLAN, Cellular Modem, SDMB Receiver, TDMB Receiver, and a wired interface such as UART, MMC, T-Flash, and multimedia devices such as a camera, mp3 decoder, and execute a particular device resource requested for interworking among the several commercial device resources according to the execution of a particular application in the mounted smart card (200). Based on this, the terminal (100) executes a special input/output device requested for interworking of the several input/output devices according to the execution of the special service application at the equipped smart card (200). In other words, the terminal (200) receives a list of identification numbers for the several equipped service applications from the smart card (200) at the step of initial negotiation with the smart card (200) with the power supply. By doing so, the terminal (100) checks the identification number for the special service application selected by the user, and requests the special service application to execute by transferring the checked identification number to the smart card (200).

Moreover, the terminal (100) controls the execution for the special input/output device requested from the smart card (200) in executing the special service application, thereby making the output value according to the execution of the service application be transferred to the user through the special input/output device. More specifically, the terminal (200) receives a checking request for supporting the special input/output device needed during the execution of the special service application from the smart card (200) according to the execution request of the special service application, and receives an output value according to the execution of the service application by notifying the results to the smart card (200) if it is capable to support as a result of checking. Meanwhile, being unable to support the special input/output device, the terminal (100) notifies to user through the input/output device, for example on an LCD screen, the special service application is unable to be executed.

In this connection, the smart card (200) is equipped with several service applications, and executes the corresponding application and transfers an output value according to it to the terminal (100) if the execution request for the equipped special service application is received from the terminal (100). More specifically, the smart card (200) prepares a list of identification numbers for separating each of the equipped several service applications at the step of initial negotiation with the terminal (100) with the power supply and provides it to the terminal (100). By doing so, the smart card (200) wakes up the corresponding service application based on the corresponding identification number, if the execution request for the special service application through transfer of the identification number from the terminal (100) is received. Moreover, if the special service application is woken up, the smart card (200) collects a list of input/output devices needed for execution, requests the terminal to check support of the corresponding input/output device, and makes the output value be transferred to the terminal (100) by carrying out the corresponding service application requested for the execution if only the support is checked.

Meanwhile, the terminal (100) prepares a list of several input/output devices made during the initial startup with the power supply, in other words at the initial negotiation with the smart card (200), and is able to apply construction for providing the prepared list of the input/output devices to the smart card (200). Based on this, the terminal (100) receives a list of service applications capable to interwork analyzed based on the list of the input/output devices from the smart card (200), and is enable to provide the service application list to be serviced based on the performance of the existing terminal by registering the received service application list. At this time, the terminal (100) may receive a list of service applications not to be serviced from the smart card (200). It is preferable that, based on this, the application list to be serviced and the application list not to be serviced are represented with distinguished through the menu screen of the terminal etc.

In this connection, the smart card (200) receives a list of the input/output devices provided from the terminal (100) during initial startup with the power supply, in other words, at the step of the initial negotiation with the terminal (200), and selects an executable service application according to performance of the terminal (100) based on this. That is, the smart card (200) analyzes the input/output device needed for startup of each of the equipped several service applications, and decides whether all the analyzed input/output devices exist on the input/output device list provided from the terminal (100) or not. By doing so, the smart card (200) lists up all the existing input/output devices needed for executing the service application on the input/output device list, and transmits the corresponding service application to the terminal (100).

As examined above, according to the interface system between a terminal and a smart card of the present invention, the terminal (100) has the form of a dummy device having only an input/output device resource, and mobile carriers can provide services directly to the customers through a smart card (200) without cooperation of the terminal manufacturers by implementing the core functions of the service application within smart card.

Figure 2:
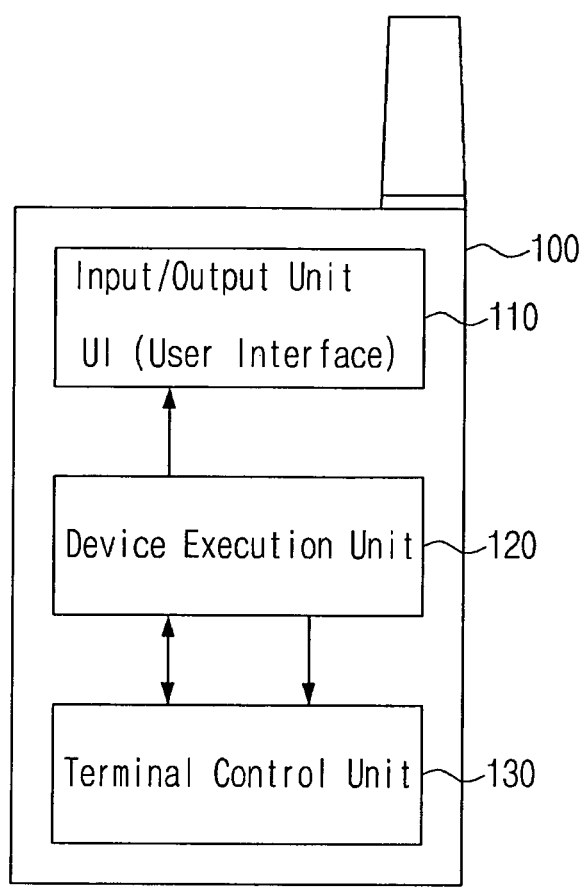
FIG. 2 is an outline configuration of a terminal according to an example embodiment of the present invention.
Figure 3:
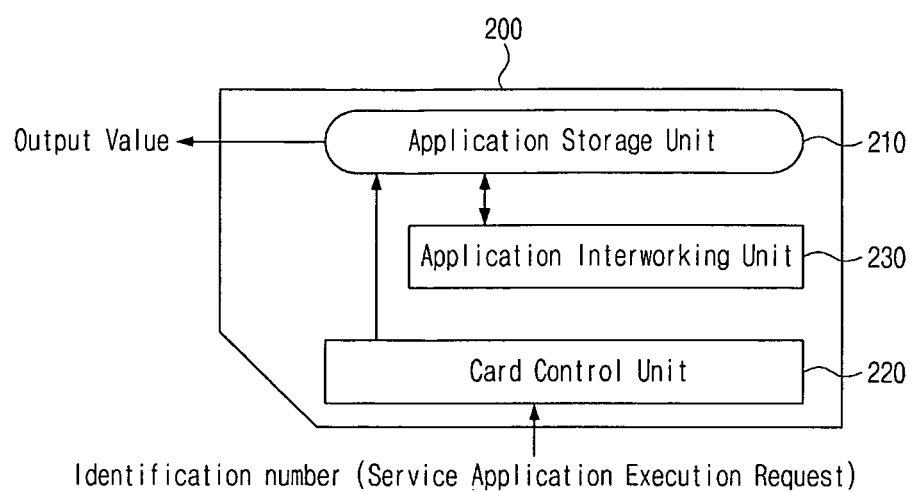
FIG. 3 is an outline configuration of a smart card according to an example embodiment of the present invention.

With reference to FIG. 2 and FIG. 3, the detailed configuration of terminal (100) and smart card (200) is described below.

First, let us look at the configuration of terminal (100) of the present invention by referring to FIG. 2. The terminal (100) has the configuration of an input/output unit (110) including several input/output devices, a device execution unit (120) for executing each of various devices, and a terminal control unit (130) for managing the various equipped device resources and for building the interface with the smart card.

The above input/output unit (110) has a configuration including several input/output devices, for example, a typical UI (User Interface) equipped with mobile communication terminals such as a keypad, LCD screen, speakers, etc. and also including a wireless interface such as Bluetooth, WLAN, Cellular Modem, SDMB Receiver, TDMB Receiver, and a wired interface such as UART, MMC, T-Flash, and multimedia devices such as a camera, mp3 decoder, and through these, it receives the user requests and also delivers the output value according to the execution of service applications of the smart card (200) by the execution control of the device execution unit (120).

The above device execution unit (120) is loaded with the execution drivers for execution control of several input/output devices equipped in the input/output unit (100), and by this, the output value is to be provided to users by executing the input/output device if the output value is transferred by the execution of the service application of the smart card (200) through the terminal control unit (130).

The terminal control unit (130) requests the smart card (200) to execute the special service application according to the user's request through the special input/output device. More specifically, the terminal control unit (130) receives a list of identification numbers for the equipped several service applications from the smart card (200) at the step of initial negotiation with the smart card (200) with the power supply. By this, the terminal (100) checks the identification number for the special service application selected by the user, and requests the special service application to be executed by transferring the checked identification number to the smart card (200).

In addition, the terminal control unit (130) requests the device execution unit for action for the special input/output device requested from the smart card (200) during the execution of the special service application, thereby making the output value according to the execution of the service application be transferred to the user. More specifically, the terminal control unit (130) receives a checking request for support of the special input/output device needed for execution of the special service application from the smart card (200) according to an execution request of the special service application, and receives an output value according to the execution of the service application by notifying the results to the smart card (200) if it is capable to support as a result of checking. Meanwhile, the checking request for support of the special input/output device needed during execution of the special service application received from the smart card (200) may include profile information of the input/output device. That is, it is preferable that the I/O device required to support is a camera, since the specific information of the device such as pixels, lens brightness, zoom level, the manufacturer would be required, this information must be defined in the device information profile.

As examined above, the configuration of the terminal (100) according to the present invention, since the terminal (100) has the form of a dummy device only with input/output device resources, the costs for terminal development can be reduced.

Next, with reference to FIG. 3 to examine the configuration of the smart card (200) according to the present invention, the smart card (200) has a Universal Subscriber Identification Module (USIM) with the default configuration, and a configuration including an application storage unit (210), card control unit (220), and application interworking unit (230).

The above application storage unit (210) is loaded with several service applications executable based on the software platform. More specifically, the application storage unit (210) can be saved by giving the identification number for each service application to distinguish several service applications.

The card control unit (220) wakes up the corresponding service application embedded within the application storage unit (210) according to the execution request for a special service application of the terminal. More specifically, the card control unit (220) prepares a list of identification numbers for distinguishing each of the equipped several service applications at the step of initial negotiation with the terminal (100) with the power supply and provides it to the terminal (100). By this, if the execution request for the special service application through transmission of an identification number receives from the terminal, the card control unit (220) wakes up the corresponding service application based on the corresponding identification number.

The application interworking unit (230) checks whether the special input/output device equipped with the terminal requested for interworking during the execution of the special service application embedded within the application storage unit (210) is usable or not. More specifically, special service application is waked-up through the card the control unit (220) and the application interworking unit (230) collect a list of input/output devices needed for execution, requests the terminal (100) to check support of the corresponding input/output device, and makes the corresponding service application requested for execution be executed and the output value transferred to the terminal (100) if only the support is checked. At this time, if the support of the input/output device is checked, the application interworking unit (230) transmits profile information of each input/output device with the list of the input/output needed for execution. For example, if the I/O device required to support is a camera, since the specific information of the device such as pixels, lens brightness, zoom level, the manufacturer would be required, this information must be defined in the device information profile.

As examined above, according to the configuration of the smart card (200) of the present invention, even if the users insert their USIM card into other terminals, the same environment can be provided in which they will be able to use the services as before, and also allowing the mobile carriers to provide the services directly to the customers through the smart card (200) without cooperation of the terminal manufacturers by the implementation of core functions of service applications within the smart card (200).

Figure 4:
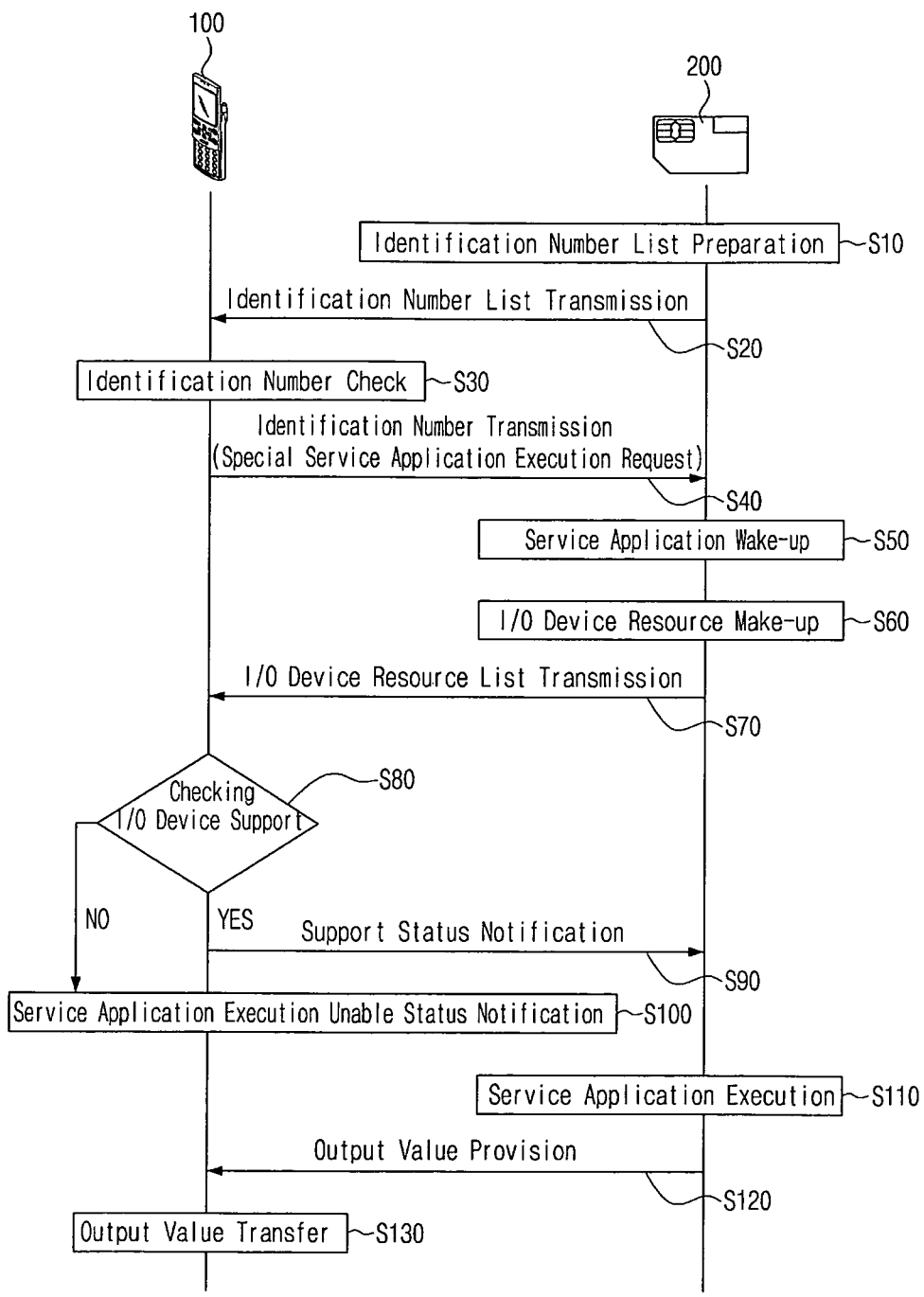
FIG. 4 is a flow chart to describe the interface method between terminal and smart card according to an example embodiment of the present invention.

With reference to FIG. 4 and FIG. 6, the interface method between a terminal and a smart card is to be described below according to an example embodiment of the present invention.

The interface method between a terminal and a smart card according to an example embodiment of the present invention is described in detail with reference to FIG. 4 to FIG. 6. Here, for the convenience of description, it is to be described with the reference numbers for the configuration shown in FIGS. 1 and 3.

First, at initial startup with the power supply, the smart card (200) prepares a list of identification numbers for distinguishing each if the equipped several service application to terminal (100)(S10-S20).

Then, the terminal (100) requests the special service application to be executed based on the identification number list transferred from the smart card (200)(S30-S40) according to the user's request. Preferably, the terminal (100) checks the identification number for the special service application selected by the user based on the identification number list for the equipped several service applications received from the smart card (200) at the step of initial negotiation of the smart card (200) with the power supply, and requests the special service application to be executed by transferring the checked identification number to the smart card (200).

Then, the smart card wakes up the embedded service application according to the execution request for the special service application of the terminal (S50). Preferably, if the execution request for the special service application is received through transmission of the identification number from the terminal (100), the smart card (200) wakes up the corresponding service application mapped into the corresponding identification number.

Then, the smart card (200) checks the support for the special service application on the terminal required for interworking during the execution of the special service application (S60-S100). Preferably, if the special service application is woken up, the smart card (200) collects the input/output device resource list needed for the execution, and requests the terminal (100) to check the support of the corresponding input/output device. The terminal (100) checks the support of the special input/output device based on the special input/output device resource list transmitted from the smart card (200), and notifies the support status of the special input/output device to the smart card (200) if the support of the special input/output device is checked. Meanwhile, if the support for the special input/output device is unable to support, the terminal (100) notifies the user through the input/output device, for example LCD screen, that the special service application is unable to be executed.

Then, the smart card (200) provides an output value according to the execution of the special service application to the terminal (100)(S110-S120). Preferably, the smart card (200) executes the corresponding service application required for execution and transfers an output value to the terminal (100).

Finally, the smart card (100) transfers the output value provided from the smart card (200) to the user through the equipped special input/output device (S130).

As examined above, according to the interface system between a terminal and a smart card of the present invention, the terminal (100) has only the form of a dummy device, and mobile carriers can provide the services directly to the customers through the smart card (200) without cooperation of the terminal manufacturers by implementing the core functions of the service application within the smart card.

Figure 5:
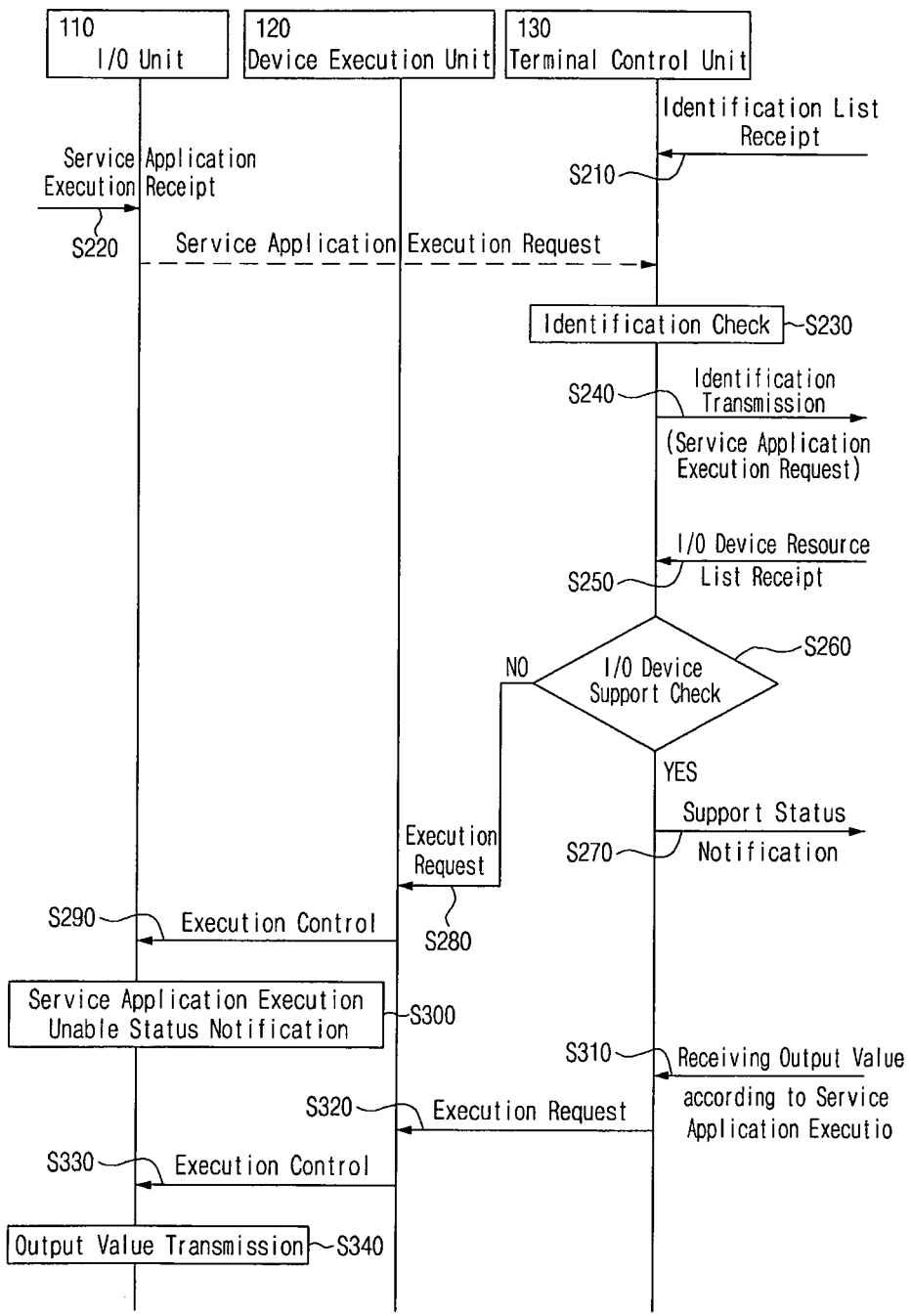
FIG. 5 is a flow chart to describe the behavior of a terminal in the interface method between a terminal and a smart card according to an example embodiment of the present invention.

With reference to FIG. 5, the behavior of the terminal in the interface method between a terminal and a smart card is to be described below according to an example embodiment of the present invention.

First, the terminal control unit (130) receives a list of identification numbers for the equipped several service applications from the smart card (200) at the step of initial negotiation of the smart card (200) with the power supply (S210).

Then, the input/output unit (110) is requested for the execution of special service applications from the user through the special input/output device (S220).

Then, the terminal control unit (130) requests the smart card (200) to make the special service application executed according to the user's request through special the input/output device (S230-S240). Preferably, the terminal control unit (130) checks the identification number for the special service application selected by the user based on the identification number list for the equipped several service applications from the smart card (200) at the step of initial negotiation of the smart card (200) with the power supply, and requests the special service application to be executed by transferring the checked identification number to the smart card (200).

Then, the terminal control unit (130) receives the request for the support of the special input/output device needed during the execution of the special service application from the smart card (200) according to the execution request of the special service application and checks the support (S250-S260).

Then, if the support is enabled as a result of the check through the step 'S260', the terminal control unit (130) notifies the result to the smart card (200), but the support for the special input/output device is unable, the terminal control unit (130) requests the device execution unit (120) for notification of the special service application's unable execution and makes it be transferred to the user (S270-S300).

Then, the terminal control unit (130) receives the output value according to the execution of the special service application from the smart card (200), requests the device execution unit (120) for execution of the special input/output device required from the smart card (200) during the execution of the special service application and makes the output value according to the execution of the service application be transferred to the user through the special input/output device (S310-S340).

As examined above, according to the behavior of the terminal (100) according to the present invention, since the terminal (100) has the form of a dummy device only with input/output device resources, the costs for terminal development can be reduced.

With reference to FIG. 6, the behavior of the smart card (200) in the interface method between the terminal and the smart card is to be described below according to an example embodiment of the present invention.

First, the card control unit (220) prepares a list of identification numbers for distinguishing each of the equipped several service application at the step of initial negotiation of the terminal (100) with the power supply and provides the list of identification numbers the terminal (100)(S410-S420).

And then, if the execution request for the special service application through transmission of an identification number from the terminal (100) is received, the card control unit (220) wakes up the corresponding service application based on the corresponding identification number (S430-S440).

And then, the application interworking unit (230) checks whether the special input/output device equipped with the terminal (100) required for interworking during execution of the special service application embedded within the application storage unit (210) is enabled or not (S450-S470). More specifically, the special service application is woken up through the card control unit (220), the application interworking unit (230) collects a list of input/output devices needed for the execution, and requests the terminal (100) to check the support of the corresponding input/output device. The application interworking unit (230) makes the corresponding service application required for the execution be executed if only the support is checked.

Then, the special service application embedded within the application storage unit (210) is executed, and the output value according to the execution is provided to the terminal (100)(S480-S490).

As examined above, according to the action of the smart card (200), the mobile carriers can provide their services directly to the customers without cooperation of the terminal manufactures by implanting the core functions of the service application within the smart card (200).

Meanwhile, with regard to the embodiment set forth herein, or the implementation phases of the algorithm can be implemented directly to the hardware or as software modules executed by the processor, or can be implemented by a combination of them. Software modules may reside on RAM, flash memory, ROM, EPROM, EEPROM, registers, hard disks, removable disks, CD-ROM, or in any other form of publicly known technically storage medium. An illustrative storage medium is connected to the processor, and as a result, the processor can read information from the storage medium and write information to it. Alternatively, storage media can be integrated into the processor. Processors and storage media can be included within the ASIC. The ASIC can be included within the terminal. Alternatively, the processor and the storage medium can be included as individual components within the terminal.

Until now, the present invention has been described in detail with reference to the preferable embodiment, but this invention is not limited to the above embodiment, and the technical ideas of the present invention will reach to the extent of possible variations or modifications by anyone even with ordinary knowledge in the technology field to which this invention belongs without aberration from the main points in the patent claims below.

The system and method for interfacing between a terminal and a smart card, and smart card applied to the same according to the present invention, are not only useful for the related technology, but also enough for sales of the applied devices with commercial potential, as well as sufficient to implement practically, transcending the limit of existing technology by making the terminal be dummy as define service execution procedure in the inside of the smart card using the new interface between the terminal and the smart card and by applying the core function of the service application to a high density smart card, so this is an invention obviously with industrial applicability.

The invention claimed is:

1. A single smart card embedded with a USIM for executing an Application On Card function by forming an interface with a terminal, the smart card comprising:
an application storage unit for storing a plurality of service applications executable on a software platform;
a card control unit for waking up a special service application stored in the application storage unit of the smart card based upon an execution request for the special service application received from the terminal; and
an application interworking unit for requesting the terminal to check if it possesses an input/output device required for interworking with the smart card to execute the special service application and if checked to provide to the terminal an output value corresponding to the execution of the special service application;
wherein said smart card, at initial startup with a power supply, prepares an identification number list of each of the service applications embedded in the smart card and transmits the identification number list to the terminal for executing the special service application upon receipt by the terminal of said output value.

2. The smart card of claim 1, wherein the application storage unit assigns an identification number to each of the one or more service applications and stores the identification number thereof.

3. The smart card of claim 1, wherein the card control unit, according to the execution request of the terminal based on an identification number assigned to the special service application, wakes up the corresponding service application mapped into the identification number.

4. An interface method to permit a terminal to carry out an Application On Card function with one smart card having a USIM (Universal Subscriber Identify Module) for executing a service application selected from a plurality of service applications embedded within said one smart card, the interface method comprising:
waking up a special service application from the plurality of service applications embedded in said one smart card according to an execution request for the special service application received from the terminal;
checking whether the terminal has the required input/output device for interworking with the smart card in executing the special service application; and
providing an output value to the terminal corresponding to the execution of the special service application when the terminal is checked as having the required input/output device.

5. The interface method of claim 4, wherein the waking-up step comprises:
preparing an identification number list for one or more embedded service applications at initial startup with a power supply and transmitting the identification number list to the terminal;
receiving an execution request based on an identification number assigned to the special service application from the terminal; and
waking up the special service application mapped into the identification number received from the terminal.

6. A computer-readable recording medium, comprising computer readable code to control at least one processing device to implement an interface method with a terminal to carry out an Application On Card function with one smart card having a USIM (Universal Subscriber Identify Module) for executing a service application selected from a plurality of service applications embedded within said one smart card, the method comprising:
waking up a special service application from the plurality of service applications embedded in said one smart card according to an execution request for the special service application received from the terminal;
checking whether the terminal has the required input/output device for interworking with the smart card in executing the special service application; and
providing an output value to the terminal corresponding to the execution of the special service application when the terminal is checked as having the required input/output device.

* * * * *